Jan. 13, 1953  D'ARCY A. YOUNG, JR., ET AL  2,625,073
MULTIPROGRAM PROJECTOR
Filed Aug. 27, 1948  5 Sheets-Sheet 1
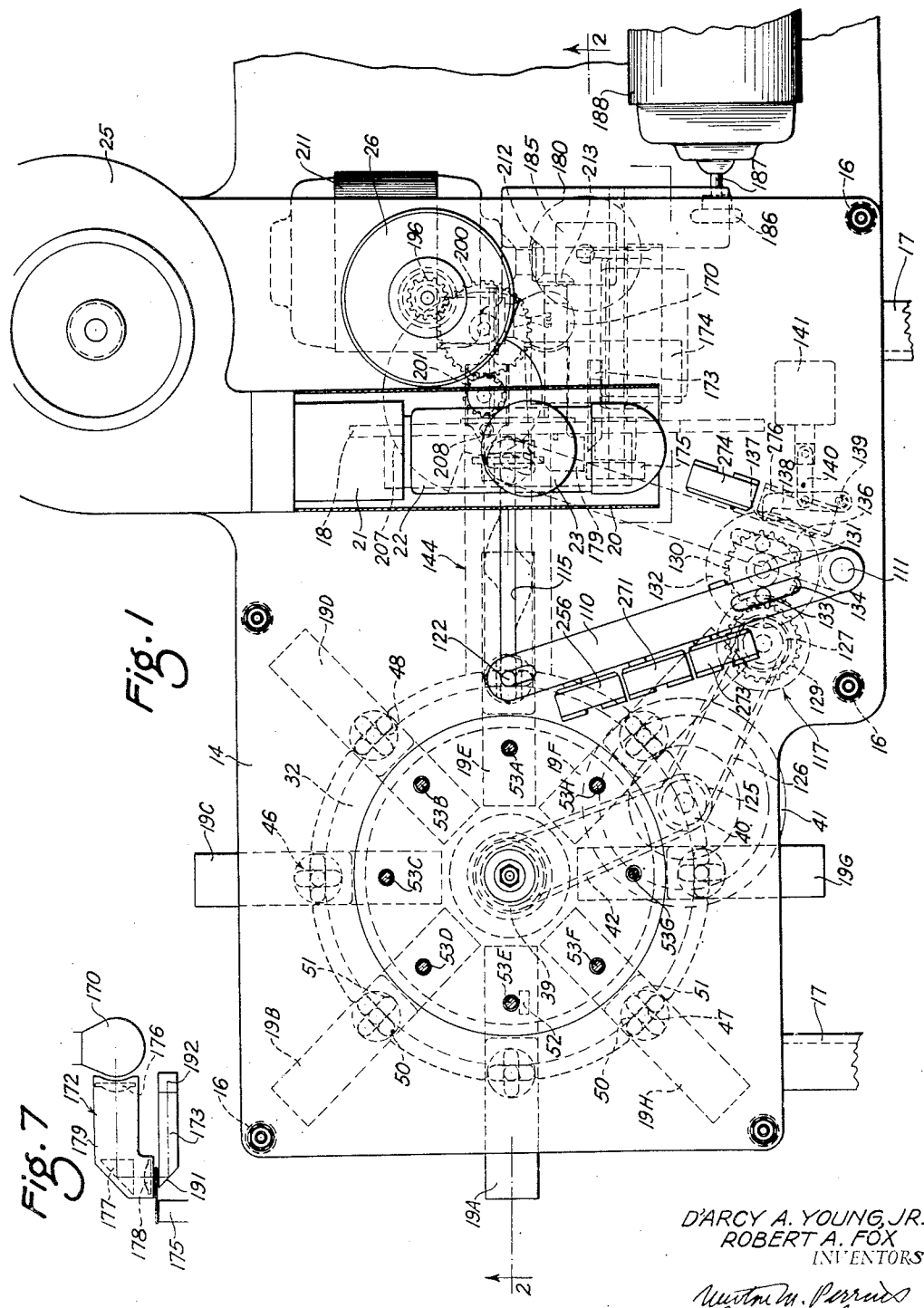
D'ARCY A. YOUNG, JR.
ROBERT A. FOX
INVENTORS

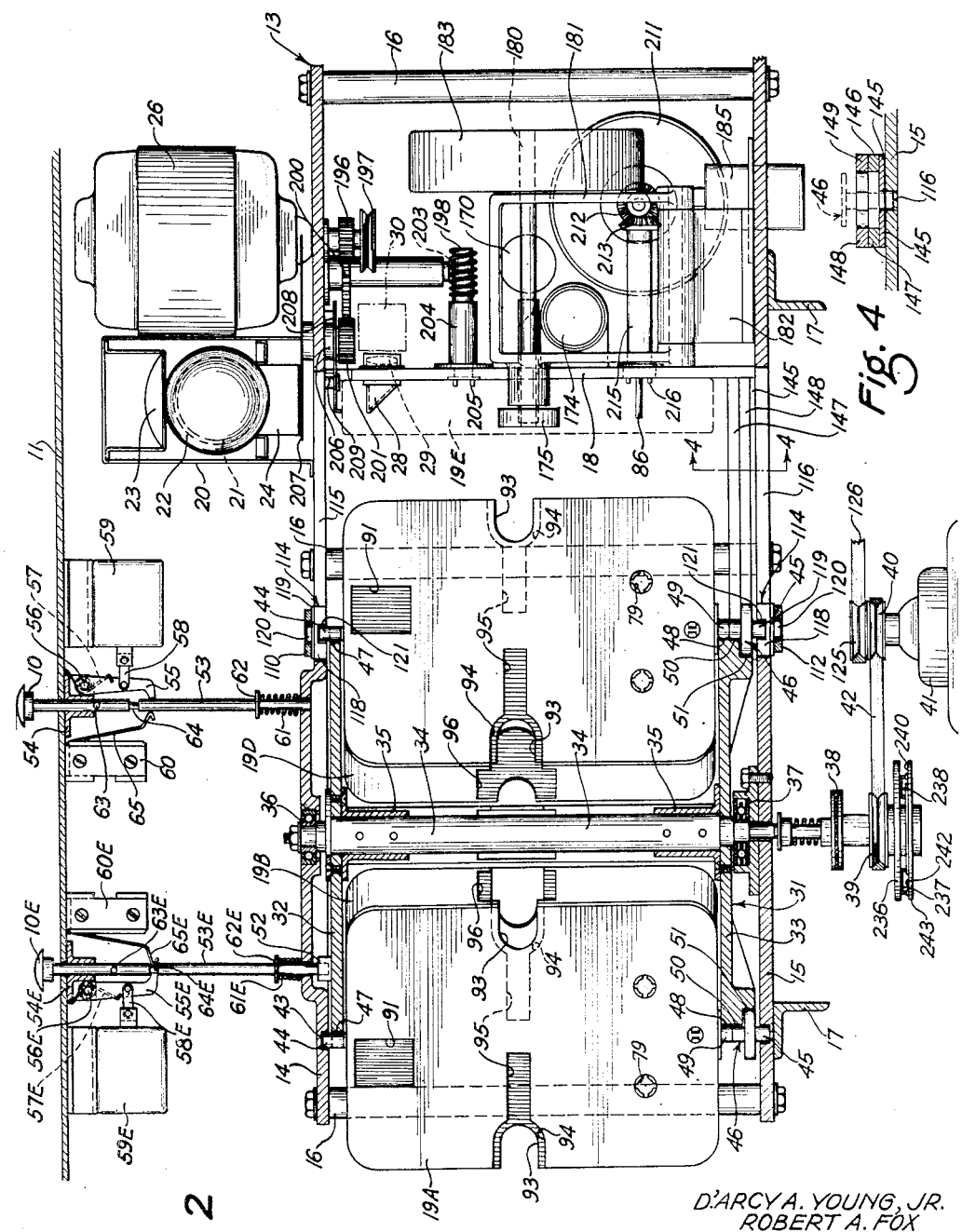

Jan. 13, 1953 D'ARCY A. YOUNG, JR., ET AL 2,625,073
MULTIPROGRAM PROJECTOR
Filed Aug. 27, 1948 5 Sheets-Sheet 3
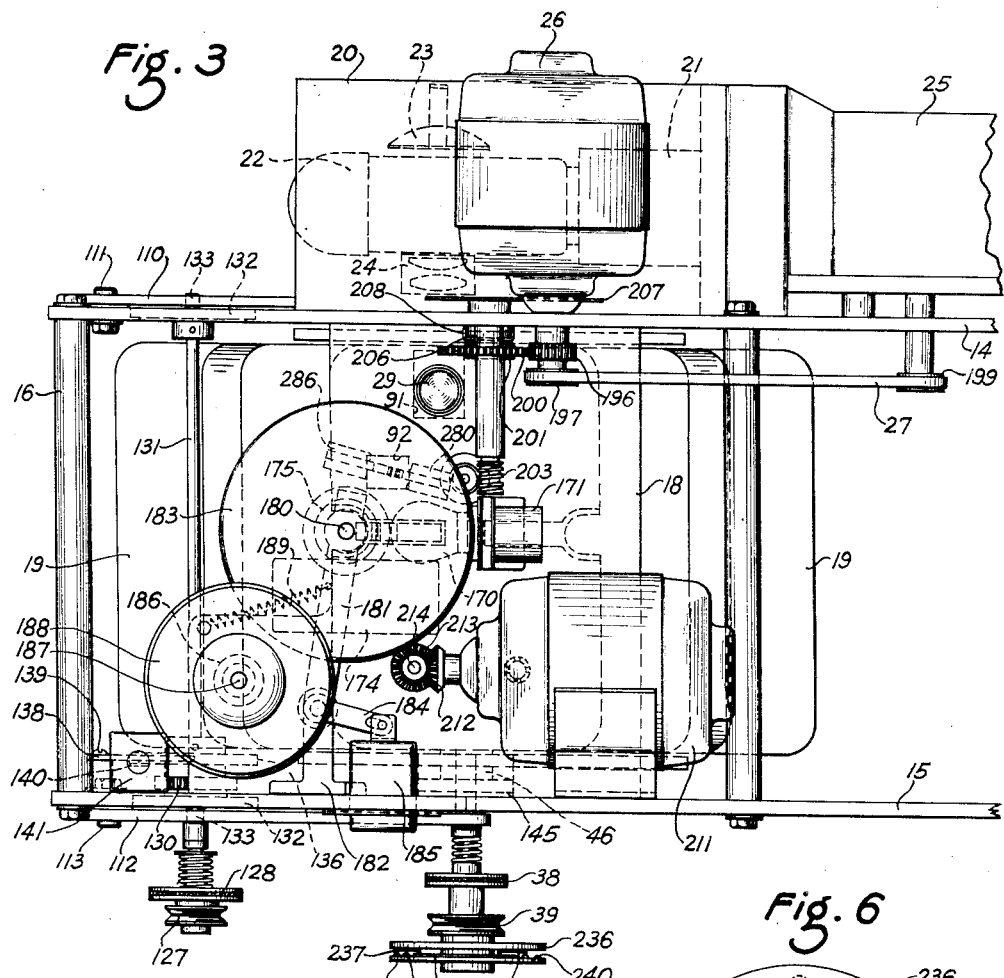
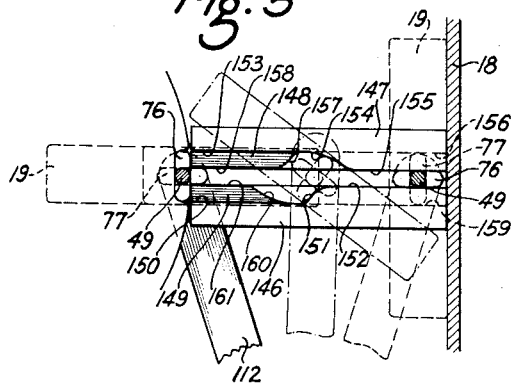
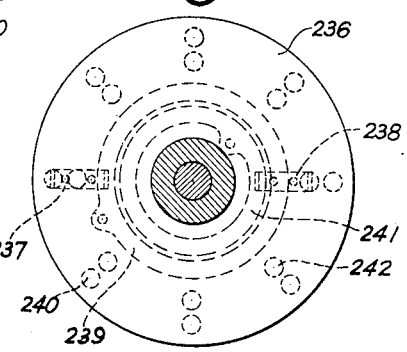
D'ARCY A. YOUNG, JR.
ROBERT A. FOX
INVENTORS
BY
ATTORNEYS

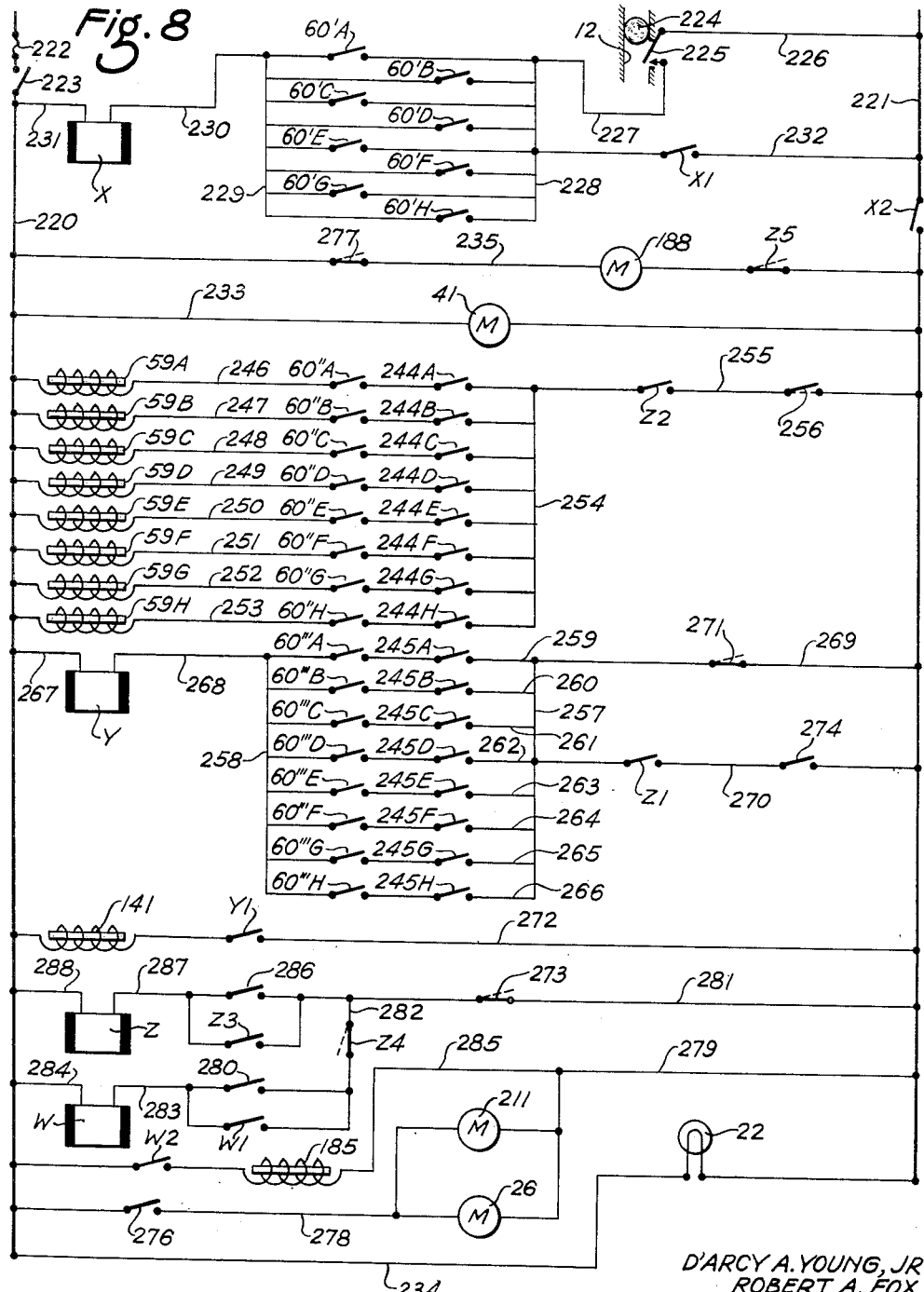

Jan. 13, 1953 D'ARCY A. YOUNG, JR., ET AL 2,625,073
MULTIPROGRAM PROJECTOR
Filed Aug. 27, 1948 5 Sheets-Sheet 5
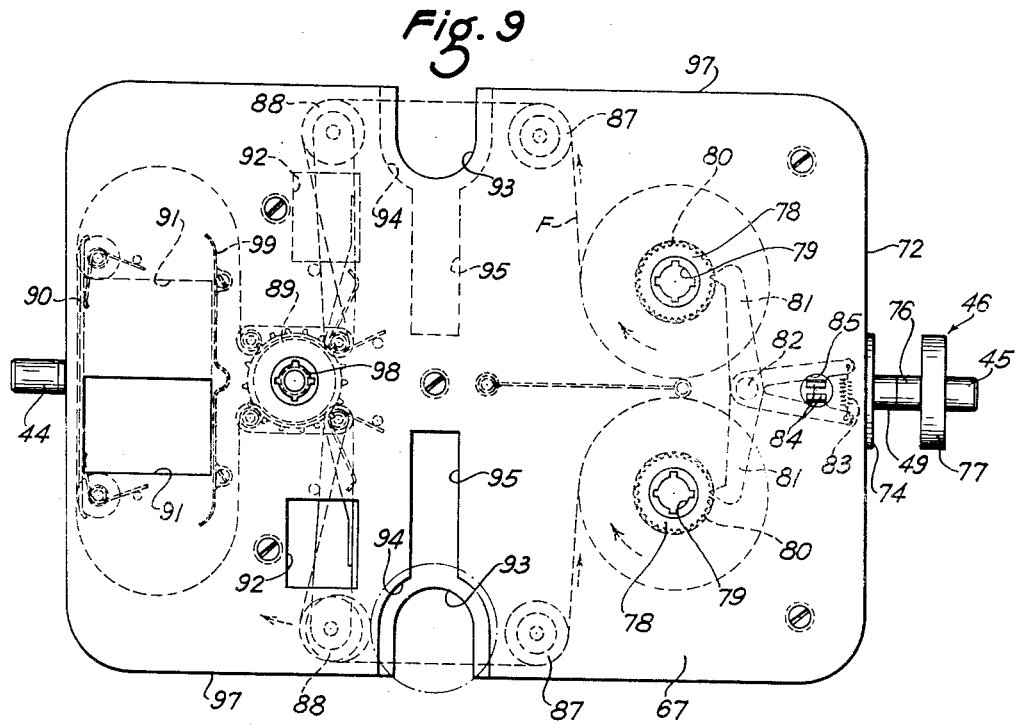
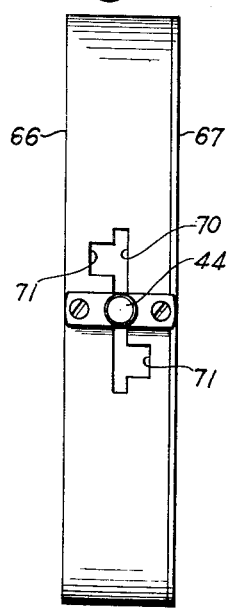
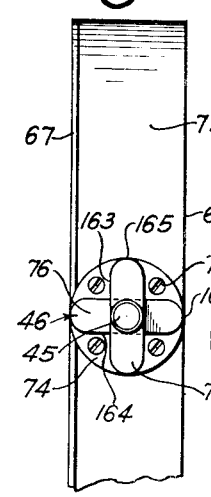
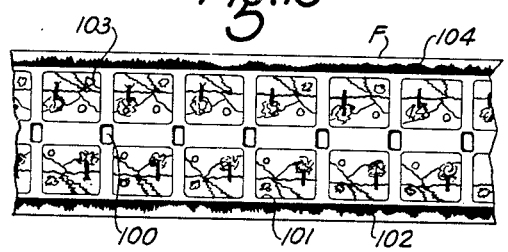
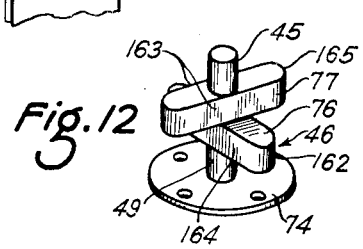
D'ARCY A. YOUNG, JR.
ROBERT A. FOX
INVENTORS Patented Jan. 13, 1953

2,625,073

UNITED STATES PATENT OFFICE 2,625,073

MULTIPROGRAM PROJECTOR

D'Arcy A. Young, Jr., and Robert A. Fox, Rochester, N. Y., assignors to Eastman Kodak Company, Rochester, N. Y., a corporation of New Jersey Application August 27, 1948, Serial No. 46,464

35 Claims. (Cl. 88—17)

The present invention relates to a multi-program projector and more particularly to an automatic sound-on-film projector for reproducing any one of several film programs.

Although automatic and selective projectors of the "juke box" type are known, they are all impractical or unsatisfactory because of their extreme complexity and inability to perform satisfactorily over a long period of time without extensive maintenance and attention. Many attempts have been made to construct motion picture projectors for use in "juke boxes" in such a way that the film can be contained in a magazine which is placed in the projector, projected and, which upon completion of the program, does not require rethreading of the film. This has been attempted in the well known repeater structure in which the continuous film strip is removed from the inside of the film convolutions and returned or fed back to the outside of the film convolutions. The repeater structure, however, has many inherent disadvantages because film in large quantities is very difficult to handle, even in the best of repeater structures, and because of the variations in finished film characteristics, damage to the film is very often encountered as a result of cinching of the film. Also, since with this type of repeater structure several subjects are printed on the film strip, the selection of a particular subject is practically impossible.

In magazine structures other than the repeater type, the cost of the magazine has been disproportionately high with respect to the cost of the film. For this reason, a magazine containing a single subject which could be selected from a group of subjects and then projected has been entirely out of the question.

The primary object of the present invention, therefore, is the provision of a selective automatic multi-program projector comprising simple and practical film handling units on a movable carriage and containing a film strip having a single subject thereon, means for indexing the film-handling unit into a transporting station, and means for transporting the film-handling unit into and from a projecting station.

Another object of the invention is the provision on each of the plurality of film-handling units of a means for cooperating with a fixed cam track for rotating the film-handling unit through 90 degrees as it is moved both toward and away from the projecting station.

A further object of the invention is the provision of a film-handling unit containing a film strip having its perforations centrally of said strip with image areas on each side of said perforations and a sound track between each image area and the edge of said film strip, said image areas having the length thereof extending lengthwise of the film strip and printed in a reverse direction with respect to each other whereby upon rotation of said film-handling units through 180 degrees the rewinding of the film strip is eliminated.

A still further object of the invention is the provision of a film-handling unit having its film advancing and guiding mechanism and arranged symmetrically about its lengthwise central axis so that upon rotation of said film-handling unit through 180 degrees the function of the supply and take-up reels are reversed and rewinding of the film strip is eliminated.

Another object of the invention is the provision of a means for rotating the film-handling unit through 180 degrees from its position in the transporting station by successively rotating said film-handling units through 90 degrees as it is moved to the projecting station and through a second 90 degrees as it is moved from the projecting station into the transporting station.

A still further object of the invention is the provision of a sound pick-up assembly comprising a sound drum and a fly wheel rotatably mounted on a pivotally mounted yoke member, means for initiating rotation of said sound drum before contacting the film strip, and a means for moving said sound pick-up assembly into juxtaposition with said moving film strip after said film-handling unit has been moved into the projecting station.

And yet another object of the invention is the provision of a control circuit initiated by means on the moving film strip for moving said sound pick-up up assembly from the sound drum rotating means into juxtaposition with respect to said moving film strip and for initiating at the end of said film program the operating cycle for returning the selected film-handling unit to the carriage means.

A further object of the invention is the provision of a film-handling unit containing a film strip provided with a notch near the leading end for initiating the movement of the sound pick-up assembly toward said film strip and a second notch distinguishable from said first notch near the trailing end of said film strip for initiating a control circuit for removing said sound pick-up assembly from said film-handling unit and for returning said film-handling unit to the transporting station, said notches being on the same side of said film strip with a second set of like notches inversely arranged on the other side of said film strip.

Another object of the invention is the provision of an indexing arrangement for positioning said film-handling units selectively with respect to a fixed station and for initiating a control circuit for moving said film-handling unit from said station to said projecting station.

Other objects and advantages of the invention will be apparent to those skilled in the art by the description which follows:

The above-mentioned and other objects of the invention are embodied in a multi-program sound-on-film photographic projector comprising a frame, an optical system thereon, a sound reproducing means including a photoelectric cell on said frame, a carriage means for moving a plurality of film-handling units each adapted to contain a centrally perforated film strip having a pair of oppositely printed images on each side of said perforations and sound tracks between each image area and the edges of said film strip, a carriage-moving means for said carriage means, an indexing means for positioning the selected film-handling unit in said transporting station, a transporting means adapted to operatively engage the selected film-handling unit when in said transporting station for moving said film-handling unit along a cam track to the projecting station, operating means on said film-handling unit adapted to engage said cam track for rotating said film-handling unit through 90 degrees as it is moved both toward and away from the projecting station, a film-advancing means adapted to be engaged by said film-handling unit when in said projecting station, drive means engaging the sound drum fly wheel and initiated by said transporting means for bringing said sound drum up to the film speed, switch means on said frame actuated by a notch in the leading end of said film strip when said film-handling unit is in the projecting position for initiating a control circuit for moving said sound reproducing assembly into juxtaposition with said moving film strip, and a second switch means actuated by a notch in the trailing end of said moving film strip for initiating a control circuit for removing said sound reproducing assembly from said film strip, said control circuit also initiating said transporting means for returning said film-handling unit to said carriage means. Obviously the aforementioned means and elements not only combine to produce the complete combination described, but said elements also cooperate two or more at a time to produce other combinations or sub-combinations which are contemplated by the invention and claimed hereinafter. Thus the present invention is not to be limited by the illustrated embodiment thereof but has a scope as broad as the interpretation of the claims permits.

Reference is now made to the accompanying drawings wherein similar reference characters designate similar elements and wherein:

Fig. 1 is a front elevation of the frame and the projector structure carried or supported by said frame;

Fig. 2 is a partial section, taken substantially on the line 2—2 of Fig. 1, and showing particularly the carriage means, carriage moving means, selecting means, and the fixed elements of the projector;

Fig. 3 is a right end elevation of the frame and the structure supported thereby as shown in Fig. 1;

Fig. 4 is a detail sectional view of the guide means and cam track associated therewith, taken substantially on the line 4—4 of Fig. 2;

Fig. 5 is a detail diagrammatic view of the cam track and showing the manner in which the film-handling unit is rotated as it is moved toward the projecting position;

Fig. 6 is a detail view of the multiple switch unit which is actuated when the carriage means is brought to a stop with the selected film-handling unit in position for movement toward the projecting station;

Fig. 7 is a detail view of the exciter lamp and the optical system for illuminating the sound track on one edge of the film strip;

Fig. 8 is a wiring diagram showing the various operating and control circuits for the multi-program projector;

Fig. 9 is a side elevation of the film-handling unit and showing the symmetrical arrangement of its parts about the central axis;

Fig. 10 is a top view of the film-handling unit and showing the arrangement of the claw and projecting apertures;

Fig. 11 is a bottom view of the film-handling unit and showing the operating means secured thereto which engages the cam track for rotating the film-handling unit;

Fig. 12 is a detail perspective view of the operating means for the film-handling unit.

Fig. 13 is an enlarged front elevation of the film strip and showing the arrangement and relation of the image areas and the location of the sound tracks; and Fig. 14 is a detail view of the film strip and showing the arrangement of the notches on the sides of the film strips and their relation to the switches actuated by said notches.

Although the illustrated embodiment of the invention relates to a film strip bearing a single subject printed with its accompanying sound track along one-half of the film strip, and the same subject and sound track printed in the opposite direction along the other half of the film strip, it is to be understood that the features of the invention are not necessarily limited to a single subject. It is entirely within the scope of the invention to provide a single film strip having one or more subjects and the accompanying sound track printed along one-half of the film and a second subject or group of subjects with its accompanying sound track printed in the opposite direction along the other one-half of the film, the perforations being, in all cases, centrally located in the film strip and between the photographic image areas. The term "film program" as used herein refers either to a single subject and sound track printed in opposite directions on each side of the film perforations, or one subject or group of subjects and its accompanying sound track printed to one side of the film perforations and a second subject or group of subjects and its accompanying sound track printed in the opposite direction on the other side of the film perforations. Furthermore a multi-program projector according to the invention may be for pictures only, for sound only, or for both sound and picture programs.

Frame and accessories

As is well known in the art, the multi-program projector is housed in a suitable cabinet, and the image beam from the projector is reflected by one or more mirrors onto a rear projection screen located in the front wall of the casing. A loud speaker and an amplifying system for the sound reproducing system are also mounted within the cabinet. Inasmuch as these elements have no bearing on the invention and are well known, they have not been disclosed in the drawings.

A plurality of manually operable devices or push buttons 10 are mounted on the front wall 11 of the cabinet and are arranged in a circular manner, as indicated by the location of the rods 53A—53H in Fig. 1. The front wall 11 of the cabinet also contains a coin slot 12 which is operated in a well known manner.

The projector proper is mounted within the cabinet and between the frame 13 comprising a front plate 14 and a rear plate 15 which are maintained in spaced relation by the posts 16. The frame 13 is supported from the base of the cabinet by a plurality of angle members 17. A mounting plate 18 is secured between the plates 14 and 15 and serves to position the selected film-handling unit 19 in the projecting station.

The plate 14 has fixed thereto a lamphouse 20 which contains a socket 21 for a light source or projection lamp 22. A reflector 23 and the condenser lens assembly 24 are also mounted within the lamphouse 20. The blower 25 is mounted on the plate 14, is connected to the lamphouse 20 for directing a blast of air therethrough, and is operated by the motor 26 by means of the belt 27. A prism 28 is mounted on the plate 18 for directing the projected image into the projection lens 29 which is also mounted on the plate 18 in optical alignment with the prism 28, the frame of film being projected, the condenser lens assembly 24 and the lamp 22. The mirror 30, which is mounted in a well known manner on the plate 18, reflects the projected image toward the system or mirrors for reflecting the image onto the rear projection screen.

The movable carriage

The movable carriage 31 comprises a plate 32 and a plate 33 which are secured to the shaft 34 by the sleeves 35 for rotation therewith. The shaft 34 is supported in the bearings 36 and 37 mounted on the plates 14 and 15, respectively, and is rotated through the adjustable friction clutch 38 by the pulley 39. The carriage-moving means comprises the pulley 40 on the shaft of the motor 41 which is mounted on the base of the cabinet and which is connected to the pulley 39 by the belt 42. The guide means for the film-handling units as they are rotated into the transporting station comprises the fixed circular grooves 43 in the plates 14 and 15 for the pin 44 secured to the front face of each film-handling unit 19 and the cylindrical extension 45 of the operating member 46 secured to the rear face of the film-handling unit 19. The retaining means and the means for moving the film-handling units as the carriage is rotated comprises a plurality of slots 47 in the plate 32 for receiving the pins 44 and which are spaced equi-angularly in accordance with the number of film-handling units. The slots in the plate 33 comprise a plurality of slots for receiving the operating member 46 and serve to move the film-handling unit and to prevent it from rotating as it is moved by the plates 32 and 33. The inner slot 48 is provided to receive the inner cylindrical extension 49 of the rotating means 46 and is similar in shape to the slot 47. The elongated intermediate slot 50 is perpendicular to the radius on which the film-handling unit is mounted, and the elongated outer slot 51 extends along the radius on which the film-handling unit is mounted. The relation and form of the slots 48, 50 and 51 can best be understood by referring to Figs. 1, 2, 11 and 12. The plate 32 has provided thereon a lug 52 which acts as an indexing or locating means for positioning the selected film-handling unit in the transporting station for movement into the projecting station in a manner to be described hereinafter.

The selecting means

The push buttons 10 are secured to the ends of the rods 53 which have one end thereof supported in the plate 14 and the other end journaled in the brackets 54 mounted on the front wall 11. A pawl 55 is pivotally mounted on each bracket 54 at 56, and a torsion spring 57 maintains the pawl in contact with the rod 53. The pawl 55 is also connected by a link 58 to the solenoid 59, and a three-pole switch 60 is mounted adjacent each rod 53. The rod 53 is encircled by a compression spring 61 which is held in position by the shoulder 62 on the rod 53 and which is limited in its movement of the rod 53 outwardly by the pin 63 engaging the bracket 54. The rods 53 are provided with a reduced portion 64 so that as the rod is moved inwardly against the action of the spring 61 upon selecting the program desired, the nose of the pawl 55 is urged into engagement with the portion 64 to hold the rod in, as disclosed in Fig. 2. At the same time, the arm 65 of the switch 60 drops into the reduced portion 64 to close the three poles of the switch 60 for a purpose to be described hereinafter. With one of the rods 53 held in position by the pawl 55, the rod lies directly in the path of the lug 52 on the plate 32 so that as the carriage is rotated by the motor 41 it acts as a stop for positioning the selected film-handling unit in the transporting position. While in the disclosed embodiment of the invention eight film-handling units have been shown mounted on the carriage, it is to be understood that any practical number of units may be mounted thereon. It is also to be understood that the number of selector units, which comprises the rod 53, solenoid 59, switch 60, etc., is also in accordance with the number of film-handling units, and to clarify certain parts of the description the reference parts have been designated 53A—53H, 59A—59H, etc. As indicated in Fig. 1, the carriage means is rotated in a clockwise direction and if the film-handling units are numbered to distingiush one program from another and in a clockwise direction, as designated by 19A—19H, then the buttons 10 must be similarly designated but numbered in a counter-clockwise direction, as indicated in Fig. 1 by rods 53A—53H. As indicated in Figs. 1 and 2, the film-handling unit 19E is in the transporting station with the lug 52 abutting the rod 53E which prevents further movement of the carriage means until the solenoid 59E removes the nose of the pawl 55E from the rod 53E, as described hereinafter. With the rod 53E in its extended position another button may be pushed inward and as the operating cycle is completed, as described hereinafter, the carriage means is rotated until the lug 52 abuts the selected rod in its path. If the same program is to be repeated, the rod is immediately placed in abutment with the lug 52 and the carriage means does not rotate. While more than one selection may be made at a time, the programs will be projected in the order of their mounting on the carriage and not necessarily in the order of their selection, since no memory device is incorporated in the embodiment of the invention as shown but which is well known in the art.

The film-handling units

The various film programs for the multi-program projector are provided in the film-handling units 19, see Figs. 1, 2 and 9 to 11 inclusive, which are detachably mounted for movement by the carriage means. Said film-handling units may vary in construction but the structure disclosed herein has many advantages and unique features. Such a film-handling unit has side walls 66 and 67 which are maintained in spaced relation by the posts 68. The end wall 69 of the film-handling unit is provided with an elongated aperture 70 for the film claw member and two projection apertures 71 which are oppositely arranged on each side of the aperture 70 and the pin 44. The end wall 72 has mounted thereon by screws 73 the operating member 46 which comprises the flange 74, the inner cylindrical extension 49, the inner actuating or follower 76, the outer actuating member or follower 77, and the outer cylindrical extension 45. It will be noted from Fig. 9 that the arrangement of parts of the film-handling unit are symmetrical about its central longitudinal axis. With this arrangement the need for rewinding is entirely eliminated. The film reels 78 are mounted between the side walls 66 and 67 and are provided with fluted cores 79 which are adapted to be engaged by a mating member when the unit is positioned in the projection position. Each core 79 is provided with a ratchet 80 which is adapted to be engaged by the nose of the pawl 81 to hold the cores against rotation. The L-shaped pawls 81 are pivoted at 82 to the wall 67 and are maintained in engagement with the ratchets 80 by the spring 83 joining the two pawls. The pawls 81 are also provided with extensions 84 which lie between the apertures 85 in the side walls, as shown in Fig. 9. A pin 86 mounted on the plate 18 is adapted to enter the aperture 85 as the film-handling unit is moved into the projection position and to engage the extensions 84 for moving and holding the noses of the pawls 81 out of engagement with the ratchets 80 during movement of the film strip. The film strip F passes from the reel 78 over the fixed roller 87 and the pivoted roller 88 to the sprocket 89 and thence into a loop and past the apertures 71 between the wall 69 and the gate 90 to the other side of the sprocket 89, around the pivoted roller 88 and the fixed roller 87 and then to the reel 78. As explained hereinafter, the film strip F is center-perforated with the images printed in opposite directions so that by rotating the magazine through 180 degrees about its longitudinal axis, the reels 78 become interchangeably the supply and take-up reels depending on the direction of movement of the film strip F. For this reason, the sprocket 89 is also mounted between the plates 66 and 67 with a fluted aperture 98 for engaging a mating part on the wall 18 when the film-handling unit is in the projection position. With this symmetrical arrangement of parts and rotation of the magazine, the direction of rotation for the various elements for driving the sprocket 89 and the reel 78 do not have to be reversed but can continually run or rotate in the same direction. The side walls 66 and 67 are provided with an aperture 91 into which the prism 28 extends for directing the image into the projection lens 29, an aperture 92 into which the arms of a pair of switches can extend for contacting the edge of the film strip F, an aperture 93 for the sound drum, an aperture 94 for the sound drum, an extension 95 of the aperture 94 for the sound optical system, and an aperture 96 in the walls 97 to permit the sound drum assembly to engage the film strip F. A partition 99 secured to the wall 66 is provided to keep the film strip F out of the aperture 91 so that the prism 28 can enter said aperture without interference as the film-handling unit is moved into the projecting station.

The film strip F, see Figs. 13 and 14, is provided with centrally located perforations 100 and has a series of picture images 101 and a variable sound track 102 on one side of the perforations. A second series of picture images 103 and a second sound track 104 is printed on the other side of said perforations and in the opposite direction. The film strip is also provided with a plurality of notches for actuating switches controlling the entry and removal of the sound reproducing system into and out of the film-handling unit 19 when in the projecting station. It will be noted from Fig. 14 that the notch 105 is near the leading edge of the film strip and the notch 106 is near the trailing edge of the film strip, the notch 105 being located sufficiently far along the film strip to allow the film to get up to speed before the sound drum is brought into contact therewith, and the notch 106 being located so that the film strip is not wound off the reel before the film drive is stopped. The circuits controlled by the notches 105 and 106 will be described hereinafter in connection with the wiring diagram.

The transporting means

The transporting means is adapted to move the film-handling unit 19 from the carriage means into the projecting station adjacent the mounting plate 18, to hold said unit in position in the projecting station during projection of the film program, and upon completion of the program to return the unit to the carriage means. During the movement of the selected film-handling unit 19, both from and toward the carriage means 31, the unit is rotated through 90 degrees by the operating means 46 in cooperation with a fixed cam track on the plate 15 in a manner about to be described.

The transporting means, see Figs. 1 and 3, comprises a lever 110 pivotally mounted at 111 on the plate 14, a second lever 112 pivotally mounted at 113 on the plate 15, a carrier means or member 114 adapted to be moved by said levers 110 and 112 in the guide means or slots 115 and 116 in the plates 14 and 15 respectively, and for engaging said selected film-handling unit 19, and a drive means 117 which is operatively connected to the carriage-moving means for moving said levers 110 and 112. The carrier means or member 114 comprises a slot-engaging portion 118, a partial flange 119, an extending pin or cylindrical portion 120, and a transverse slot 121 which is adapted to be aligned with the guide means or circular grooves 43 in the plates 14 and 15 for receiving the pin 44 and the cylindrical portion 49 of the operating member 46. The pin 120 is adapted to be engaged by the elongated slots 122 in the levers 110 and 112, and the flange 119 locates the slot 121 with respect to the grooves 43 and also prevents the member 114 from falling into the slots 115 and 116. The drive means 117 for moving the levers 110 and 112 and said selected film-handling unit 19 comprises a pulley 125 on the shaft of the motor 41 which is connected by a belt 126 to the pulley 127 on one side of the adjustable friction clutch 128. The gear 129 is driven through the clutch 128 and meshes with the gear 130 to drive the shaft 131. The shaft 131 is provided at each end with a driving disc 132 which is seated in the plates 14 and 15 and which is provided with a pin 133 for engaging the elongated slots 134 in the levers 110 and 112. A latching means or holding plate 136 is also secured to the shaft 131 and is provided with two detents 137 which are adapted to be engaged by the nose of the pawl 138 pivotally mounted on the plate 15 at 139 and normally spring biased toward said holding plate. The pawl 138 is connected by a link 140 to the solenoid 141 which when energized removes the pawl from the detent 137 and permits the shaft 131 to be rotated through the clutch 128 and the gears 129 and 130 for one-half revolution. When the pawl 138 is in engagement with one of the detents 137 and the film-handling unit is being indexed into the transporting station or the film program is being projected, the shaft 131 is held against rotation by the pawl and the slippage in the drive takes place at the clutch 128. The shaft 131, therefore, is driven only when the film-handling unit is being moved into or out of the projecting station.

The operating member 46 on the film-handling unit 19 cooperates with a cam track 144 on the plate 15 for rotating said unit through 90 degrees. This is accomplished by freely supporting the selected film-handling unit 19 between the plates 14 and 15 in the members 114 so that as the operating member 46 contacts the cam surfaces the unit is rotated through 90 degrees. The cam track 114 comprises a plurality of plates extending from the plate 33 to the plate 18 and which are secured to the plate 15 to form a part of the guide means 115, see Figs. 2, 4 and 5. The spaced parallel plates 145 are located adjacent the slot 116 and assist in guiding the cylindrical portion 45. The outer plates 146 and 147 provide a cam track for the follower 76 and the intermediate plates 148 and 149 provide a cam track for the follower 77, see Fig. 5. The plate 146 is provided with a straight surface 150 which blends into the cam surface 151 which, in turn, blends into the straight surface 152 which is aligned with the slot 116. The plate 147 is provided with a straight surface 153 which blends into a clearance curve 154 which, in turn, blends into the straight surface 155 which is also aligned with the slot 116. The plate 148 is similar to the plate 146 having a straight surface 156, a cam surface 157 and a straight surface 158 which is aligned with the slot 116, and the plate 149 has a straight surface 159, a clearance curve 160, and a straight surface 161 which is aligned with the slot 116. Since the film-handling unit always assumes the same relative position on the carriage means, the length of the follower 76 is always perpendicular to the direction of movement of said unit toward the projecting station, and the length of the follower 77 is always parallel to the direction of movement of said unit toward the projecting station. However, as the unit is moved toward the transporting station, the length of the follower 76 is parallel to the direction of movement of said unit, and the length of the follower 77 is perpendicular to the direction of movement.

As the film-handling unit 19 is moved into the transporting station where the pin 44 and the extension 45 engage the slots 121 in the members 114, the levers 110 and 112 begin to move said unit toward the projecting station, the surfaces 150 and 153 providing a guide for the ends 162 of the follower 76 and the surfaces 158 and 161 providing a guide for the sides 163 of the follower 77. When the levers 110 and 112 reach the midpoint of their travel toward the projecting station, one of the sides 164 of follower 76 contacts the cam surface 151. As said unit is moved beyond the midpoint toward the projecting station, the cam surface 151 causes the follower 76 to rotate said unit about its longitudinal axis in the slots 121 in a clockwise direction through an angle of 90 degrees. The surfaces 155 and 152 then guide the sides 164 of the follower 76, and the surfaces 156 and 159 guide the ends 165 of the follower 77.

After the film program has been projected, the film-handling unit 19 is moved toward the transporting station and the carriage means by the levers 110 and 112 with the sides 164 of the follower 76 being guided by the surfaces 152 and 155 of the plates 146 and 147, respectively, and the ends 165 of the follower 77 being guided by the surfaces 156 and 159 of the plates 148 and 149, respectively. At the midpoint of the travel, the side 163 of the follower 77 strikes the cam surface 157 and as said unit is moved beyond the midpoint, the cam surface 157 and follower 77 cooperate to rotate the unit in a clockwise direction through another 90 degrees. The follower 77 is then guided by the surfaces 158 and 161, and the follower 76 is guided by the surfaces 153 and 151. The levers 110 and 112 then move the unit until the pin 44, extensions 45 and 49, and the followers 76 and 77 engage their respective slots in the plates 32 and 33. The cam track 144 and followers 76 and 77, therefore, have cooperated to rotate the selected film-handling unit 19 through 90 degrees as it is moved both toward and away from the projecting station. As a result, the film-handling unit is in a reversed position and the reels 78 have been interchanged and the need for rewinding the film strip is eliminated.

*Sound reproducing assembly*

The sound reproducing assembly comprises the exciter lamp 170 which is mounted on the bracket 171 secured to the plate 18, the sound optical system 172, the pick-up rod 173, the photo-cell 174 which is connected to a suitable amplifying system, and the sound drum 175 over which the film passes.

The sound optical system 172 comprises a cylindrical lens 176, a prism 177, a second cylindrical lens 178 all of which are mounted, in a known manner, in a suitable retainer 179 which is secured to the plate 18 and extends through the aperture 95 of the film-handling unit 19 when said unit is in the projecting station. The pick-up rod 173 is moved into position with the sound drum and reflects the light from the exciter lamp 170 to the photocell 174 which is mounted on the plate 13, as shown in Figs. 2, 3 and 7.

The sound drum 175 is mounted on the shaft 180 which is journaled in the bracket 181 pivotally mounted on the support member 182 fixed to the plate 15. The other end of the shaft 180 has mounted thereon the flywheel 183. The bracket 181 is provided with an arm 184, see Fig. 3, which is connected to the solenoid 185. The bracket 181 is normally held against the drive roller 186 on the shaft 187 of the motor 188 by the spring 189. The pickup rod 173 is mounted on the bracket 181 and is moved with the sound drum 175 into juxtaposition with the film strip in the film-handling unit 19.

When the film unit to be projected has been selected by pushing the proper knob 10 inwardly and a coin has been inserted in the slot 12 and moved into the cabinet, the motor 188 is energized and the roller 186 starts to rotate the flywheel 183 and, hence, the sound drum 175 to bring the sound drum up to the same linear speed as the predetermined linear film speed. When the unit 19 is in the projecting station and the film has started to move, the notch 195 actuates the switch 280 to initiate energization of the solenoid 185 for moving the sound drum 175 and flywheel 183 toward the magazine. The sound drum enters the aperture 96 in the bottom of said unit 19 and the bracket 181 enters the aperture 93 with the pick-up rod 173 entering the extension 95 of the aperture 94. Since the sound drum 175 is moving at the same linear speed as the film strip, there is no strain, excessive wear, or slowing up of the film strip as it is contacted by the sound drum. As the sound drum 175 contacts the film strip, the film strip is moved toward the center of the unit to provide a partial wrap-around of the film strip about the sound drum, and the roller 88 is moved into engagement therewith, as indicated by the broken line showing in Fig. 9. It will be noted from Fig. 7 that the sound drum 175 does not contact the side of the film strip being projected. Upon deenergization of the solenoid 185, the sound drum 175 and the flywheel 183 are moved out of engagement with the unit 19 by the spring 189 and the flywheel is brought to rest against the roller 186.

With the sound drum in its film strip engaging position, the light transmitted through the sound track along the edge of the film strip by the lamp 170 through the lens 176, prism 177, and lens 178 is collected by the pick-up rod 173 having one face 191 adjacent the sound track and another face 192 adjacent the cell 174. The pick-up rod 173 is an internally reflecting rod which may be made of either glass or a transparent plastic material with the faces 191 and 192 inclined so as to direct the light beam at right angles to the face of incidence. Thus, the light directed through either of the sound tracks is efficiently collected and transmitted to the cell 174 as each film-handling unit is brought into position for reproduction therein. The remainder of the sound reproducing system comprises the amplifier and loud speaker which are connected to the photocell 174 in a known manner.

*The film advancing and take-up means*

The film advancing means and film take-up means are operative only when the film-handling unit is in the projecting station and the control of said means is governed by the position of the levers for moving said unit. According to the illustrated embodiment separate drives are provided for advancing and for taking up the film strip. The motor 26, see Figs. 1, 2 and 3, has secured to its shaft a gear 196 and a pulley 197. The pulley 197 is connected by the belt 27 to the pulley 199 on the shaft of the blower 25 which directs a blast of air over the lamp 22. The gear 196 meshes with an intermediate gear 200 which in turn meshes with the gear 201. The gear 200 is supported from the plate 14 and drives the helical gear 203 which meshes with the helical gear 198. The gear 198 is mounted in the bearing member 204 secured to the plate 18 and drives the clutch member 205 on the other end of the shaft. The clutch member 205 is adapted to engage the fluted aperture of the sprocket 89 when the film-handling unit is positioned against the plate 18 for driving said sprocket. The gear 201 is mounted on a shaft journaled in the plate 14 which has an eccentric 206 integral therewith and a shutter 207 fixed thereto at the other end. From Fig. 2 it will be noted that the shutter 207 lies adjacent the condenser lens assembly 24. The eccentric 206 engages the claw member 208 which is pivotally mounted at 209 and is oscillated in a known manner by said eccentric for entering the film perforations to advance said film strip.

The film take-up drive comprises the motor 211 which has a bevel gear 212 fixed to its shaft for meshing with the bevel gear 213 on the shaft 214. The shaft 214 is journaled in the bearing member 215 secured to the plate 18 and is provided with a clutch member 216 for engaging either of the fluted cores 79 of the reels 78 depending on which reel is acting as the take-up reel. The motor 211 is a relatively slow speed motor which will drive the take-up reel at a speed sufficient to take up the first few convolutions of the film but which will permit slippage as the convolutions increase in number so as to maintain the film in a taut condition for proper take up. With this arrangement the proper film loop can be maintained and the need for a clutch in the take-up drive is eliminated.

*Electrical control and operating circuits*

The motors, relays, switches, lamps, coin-controlled mechanism, selector switches, etc. embodied in the control and operating circuits now to be explained and diagrammatically illustrated in Fig. 8 are of standard form and commercially available. The present invention relates primarily to the arrangements and correlation of such elements to produce the control and operating functions necessary and desirable to the optimum performance of a multi-program projector.

All of the operating and control circuits to be mentioned hereinafter are connected directly across a standard source of electrical energy as represented by the mains 220 and 221, either or both of which are fed through a fuse 222 and a main switch 223.

The coin and selector control circuit comprises a well known type of coin slot 12 in the front of the cabinet which upon insertion of a coin 224 into said slot and movement of said coin into said cabinet closes a switch 225. One side of the switch 225 is connected by the line 226 to the main 221 and the other side is connected by the line 227 to the line 228. The switches 60 are three-pole switches and each pole has been designated as a switch in Fig. 8 and numbered 60'A—60'H for one pole, 60''A—60''H for the second pole and 60'''A—60'''H for the third pole, in order to provide a readily understandable circuit diagram. A switch is provided for each film-handling unit and adapted to be actuated by the rod 53 as described hereinbefore so that upon actuation of any one push button 10 all the contacts associated with that particular switch will be closed. For example, if button 10E is pushed inwardly, as shown in Fig. 2, the rod 53 will be moved into the path of the lug 52 and at the same time actuate switch 60E thereby closing all the contacts designated as 60'E, 60''E, and 60'''E in Figure 8. From Fig. 8 it will be noted that the first group of contacts for the switches 60 are connected in parallel circuit across the lines 228 and 229 and are in series circuit with the relay X and the coin-operated switch 225. The relay X is connected to the line 229 by the line 230 and to the main 220 by the line 231. With the selection of the program to be projected and the insertion of the coin, one of the switches 60'A—60'H is closed as well as the switch 225 to energize the relay X which upon energization closes the contacts X1 in the line 232 and X2 in the main 221. The relay X is therefore locked in through the line 232, since the switch 225 is opened after passage of the coin 224.

With the energization of relay X and the closing of X2, the operating circuit for the carriage motor 41 is energized through the line 233 connecting said motor with the mains 220 and 221. At the same time, the operating circuit for the projection lamp 22 is energized through the line 234 connecting said lamp across the mains 220 and 221, and the operating circuit for the motor 188 is energized through the line 235 for bringing the sound drum up to speed.

As the motor 41 drives the carriage 31 through the pulleys 39 and 40 and the belt 42, the phenolic plate 236 is rotated therewith. The plate 236 is provided with two contact members 237 and 238 which are adapted to contact the ring 239 and the contacts 240 and the ring 241 and the contacts 242, respectively, see Fig. 6. The rings 239 and 241 and the contacts 240 and 242 are mounted on the fixed phenolic plate 243. The contacts 240 and 242 are equi-angularly spaced and in accordance with the number of film-handling units provided for on the cariage 31, so that as the selected unit is brought to rest opposite the cam track 144, a circuit will be completed by the member 237 between the ring 239 and one of the contacts 240 and another circuit between the ring 241 and one of the contacts 242 by the member 238 and which are designated as switches 244A—244H and 245A—245H, respectively, in Fig. 8.

From Fig. 8 it will be noted that the solenoids 59, the second pole of each of the switches 60, designated as 60"A—60"H, and the ring 239 and one of the contacts 240, designated as 244A—244H, are connected in series and connected in parallel by the lines 246, 247, 248, 249, 250, 251, 252, and 253 across the main 220 and the line 254, the line 254 being connected to the main 221 by the line 255 to provide a selector-releasing circuit. The solenoids 59 cannot be energized, however, since the normally closed switch 256 in the line 255 is held open by the lever 110. The third pole of each of the switches 60, designated as 60'''A—60'''H, is connected in series circuit with the ring 241 and one of the contacts 242, designated as 245A—245H, and are connected in parallel circuit between the lines 257 and 258 by the lines 259, 260, 261, 262, 263, 264, 265, and 266 to provide a control circuit for movement of the film-handling unit both to and from the projecting station. The relay Y is connected to the main 220 by the line 267 and to the line 258 by the line 268. The line 257 is connected by the lines 269 and 270 to the main 221. Upon selection of the program to be projected, one of the switches 60 is closed, say 60E, and when that unit comes opposite the cam track 144, the contacts 245E will be closed so that the relay Y will be energized through the line 269, the normally open switch 271 which is held closed by the lever 110, the line 257, the line 261, the lines 258 and 268, and the line 267. Energization of the relay Y will then close the contact Y1 to permit energization of the solenoid 141 through the line 272. Upon energization of solenoid 141, the levers 110 and 112 will start to move the film-handing unit 19E toward the projecting station and the switch 256 will be opened, switch 271 will open thereby deenergizing the relay Y, and the switch 273 will be closed. When the levers 110 and 112 reach the end of their travel, the switch 274 will be closed, the switch 276 will be closed by the lever 110, and the normally closed switch 277 will be held open by the lever 112.

The opening of switch 271 will deenergize the relay Y opening the contact Y1 and deenergizing the solenoid 141. With the closing of the switch 276 in the line 278, the film drive motor 26 and the film take-up motor 211 are energized through the line 279 connected to the main 221. As the film is moved through the film-handling unit, the notch 105 permits the normally closed switch 280 to close momentarily to complete a circuit from the main 221 through the line 281, the switch 273, the line 282, through the contact 24 to the line 283 and the relay W and from said relay to the main 220 by the line 284. With the energization of the relay W, the contacts W1 and W2 are closed to provide a control circuit for the movement of the sound drum into and out of engagement with the film strip. Contact W1 locks in the relay W, and contact W2 completes a circuit from the main 221 through the line 279, the line 285, the solenoid 185 and the contact W2 to the main 221 for moving the sound drum into engagement with the film strip in the film-handling unit in the projecting station. Opening of the normally closed switch 277 cuts out the motor 188 for bringing the sound drum up to speed. At the trailing edge of the film strip, upon completion of the film program, the notch 106 permits the normally closed switch 286 to close momentarily to energize the relay Z from the main 221 through the line 281, the normally closed switch 273, the switch 286, the line 287, the relay Z and the line 288 to the main 221 to initiate a return control circuit. The relay Z upon energization closes the contacts Z1, Z2, and Z3 and opens contacts Z4 and Z5.

With the closing of Z1, relay Y is again energized from main 221 through line 270, switch 274 and contact Z1 to line 257, through line 257 to line 261 and through 245E and 60'''E to line 258, then through line 258 to line 268 and relay Y, and then through line 267 to the main 220. Relay Y then closes Y1 to energize the solenoid 141, and the levers 110 and 112 then return the film-handling unit 19E to the carriage 31. As the levers 110 and 112 start to move toward the carriage 31, the switch 274 opens to deenergize the relay Y, the switch 276 opens to cut out the motors 76 and 211, and the switch 277 returns to its normally closed position, but the motor 188 is not energized since the contact Z5 is open. At the same time Z1 is closed, Z4 opens to deenergize the relay W to permit the contacts W1 and W2 to open thereby also deenergizing the solenoid 185 to permit the sound drum 175 to be removed from the film-handling unit. When the levers 110 and 112 reach the end of their travel toward the carriage 31, the normally open switch 256 is closed, the normally open switch 271 is closed, and the normally closed switch 273 is opened. With the closing of switch 256, the solenoid 59E is energized from the main 221 through the line 255 and the switch 256 and contact Z2 to the line 254, and through the line 248 and the contacts 60''E and 244E to release the rod 53E which actuates the switch 69E to open the three poles, 60'E, 60''E and 60'''E of said switch. With the opening of the three poles of 60E, the relay Y cannot be energized even though the switch 271 is closed, the relay X is deenergized to open X1 and X2 thereby cutting out the motors 188 and 41 and the lamp 22, and at the same time with the opening of switch 273, the relay Z is deenergized to open Z1, Z2 and Z3 and close Z4 and Z5. The contacts 244E and 245E are not opened until the carriage 31 is again rotated to index another selection into the position for movement into the projecting station.

In the illustrated embodiment of the control circuits, some of the circuits, relays and switches may be replaced by equivalent means. However, such alterations or variations are within the scope of the invention as long as the operation or sequence resulting is within the scope of the claims.

*Complete operating circle*

Although the foregoing description of the multi-program projector of the invention has clearly stated the function and operation of each means, element, circuit, etc., a brief description of a complete cycle will now be given. Assuming that the switch 223 is closed, that the film unit 19E is in the transporting station, as shown in Fig. 1, and that the contacts 244E and 245E are closed, the next film program can now be selected. If film-handling unit or program 19G is selected, the button 10G is pushed inwardly thereby moving the rod 53G inwardly to permit the pawl 55 to engage the portion 64 to hold the rod in position against the action of the spring 61 and at the same time actuating switch 60 through arm 65 to close contacts 60'G, 60''G and 60'''G. The coin 224 is then inserted in the slot 12 and moved inwardly to momentarily close the coin switch 225 which completes the selector circuit from main 221 through 60'E and the relay X to the main 220 to energize the relay X for closing the contacts X1 and X2. Contact X1 locks in the relay X, and contact X2 closes the main 221 to initiate the operating circuits for the carriage motor 41, the motor 188, and the projection lamp 22. The motor 188 rotates the roller 189 to bring the flywheel 183 and, hence, the sound drum 175 up to the film speed before the sound drum is moved into juxtaposition with the film strip.

The motor 41, through the pulleys 39 and 40 and the belt 42, drives the carriage means 31 through the clutch 38 in a clockwise direction until the lug 52 thereon abuts the rod 53G which positions the selected film-handling unit 19G opposite the cam tracks 144. The film units are guided in their movement by the circular guide means or grooves 43 in the plates 14 and 15, and the selected unit is brought to rest with the pin 44 and the extension 45 engaging the slot 121 in the carrier means or members 114. The units are moved in the guide means or recesses 43 by the slots 47 in the plate 32 which engage the pins 44, and the combination of slots 48, 50 and 51 which engage the operating members 46 and which also serve to prevent said units from rotating during movement. It will be noted from Fig. 1 that since the carriage means 31 is always rotated in a clockwise direction, the lug 52 must pass under the rods 53E, 53D, 53C, 53B, 53A, and 53H before abutting the rod 53G. For this reason in the case where more than one selection has been made, it can be readily appreciated that the units will be indexed into position in the order that the lug 52 abuts the protruding rods, rather than in the order in which the rods were pushed in or the order in which the selections were made. As the shaft 34 is rotated to move the unit 19G into position, the plate 236 and the members 237 and 238 associated therewith are also rotated to open the contacts 244E and 245E, respectively, and to successively close and open the contacts 244D, 244C, 244B, 244A, and 244H, and 245D, 245C, 245B, 245A, and 245H, respectively. When the lug 52 stops rotation of the carriage 31 by abutting the rod 53G, the contacts 244G and 245G are closed, and the clutch 38 slips as the motor 41 continues to drive. Since the pawl 138 is in engagement with one of the detents 137 in the plate 136, the shaft 131 is held against rotation and the clutch 128 permits the drive to slip. With the closing of the contacts 245G, a circuit is completed through the switch 271, contacts 245G and 60'''G to energize the relay Y. The relay Y closes the contact Y1 and the solenoid 141 is energized to withdraw the pawl 138 from the detents 137. With the pawl removed from the detents 137 the motor 41, through the pulleys 125 and 127 and the belt 126, rotates the shaft 131 through the clutch 128 and the gears 129 and 130. As the shaft 131 is rotated, the levers 110 and 112 are rotated about their pivots 111 and 113, respectively, by the pins 133 on the discs 132 to move the film-handling unit 19G toward the plate 18.

Since the selected unit 19G was stopped by the lug 52 with the pin 44 and the extension 45 in engagement with the slot 131 in the carrier means or members 114, upon energization of the solenoid 141, the levers 110 and 112 immediately start to move said unit toward the plate 18. As the levers 110 and 112 start to move, the switch 256 is released by the lever 110 and allowed to open, the switch 271 is allowed to open so that the relay Y is deenergized thereby opening Y1 and permitting the pawl 138 to engage the periphery of the plate or latching means 136, and the switch 273 is permitted to close. When the lever reaches the mid-point of its travel toward the projection position, the follower 76 engages the cam surface 151 and movement of said unit past the midpoint causes said unit to be rotated through 90 degrees in a clockwise direction. The unit is then moved into the projecting station against the plate 18 and held in position by the levers 110 and 112. As said unit is moved into position against the plate 18, the pin 86 enters the aperture 85 in the wall 66 of said unit 196 to release the pawls 81 from the ratchets 80. At the same time the prism 28 enters the aperture 91 in the wall 66, the operating arms of the switches 280 and 286 enter the aperture 92 in the wall 66 to engage the edge of the film strip, and the retainer 179 for the sound optics enters the aperture 95. When the levers 110 and 112 have positioned the unit 19G against the plate 18, the pawl 138 engages the detents 137 to arrest the rotation of the shaft 131 and the drive thereof slips by means of the clutch 128. With said unit in position, the clutch members 205 and 216 will have engaged the fluted cores of the sprocket 89 and the reel 78, respectively, and the levers 110 and 112 will have closed switches 274 and 276 and opened the switch 277. Closing of the switch 276 energizes the motors 26 and 211 to advance and take up the film strip. Opening of the switch 277 cuts out the motor 188 for bringing the sound drum 175 and flywheel 183 up to speed, but the notch 105 at the leading end of the film strip permits the switch 280 to close momentarily which energizes the relay W to close its contacts W1 and W2, the closing of contact W1 locking in the relay W and closing of contact W2 permitting the energization of solenoid 185. When the solenoid 185 is energized, the arm 184 is rotated in a clockwise direction about its pivot to move the bracket 181, the flywheel 183, and the sound drum 175 toward the film-handling unit against the action of the spring 189. The loss in speed of the drum 175, due to the interval between the opening of switch 277 and closing of the switch 280, is not appreciably great enough to make any difference in actual performance.

With the energization of the motor 26, the shutter 207 is driven through the gears 196, 200, and 201, the claw member 208 for advancing the film strip frame by frame is oscillated by the eccentric 206 integral with the shaft on which the shutter 207 and the gear 201 are fixed, and the sprocket 89 is driven by the clutch member 205 through the gears 198 and 203, which, in turn, are driven by the gear 200. The reel 78 is driven from the motor 211 through the gears 212 and 213 and the clutch member 216 for taking up the film strip. As is well known, the film strip is illuminated during projection by the lamp 22, the light rays being collimated by the condenser lens assembly 24. The image is reflected by the prism 28 out of the film-handling unit and projected by the lens 29 onto the mirror 30 from which it is reflected through a system of mirrors onto a rear projection screen on the front of the cabinet in which the projection equipment is housed.

Upon completion of the film program, the notch 106 allows the switch 286 to close momentarily thereby energizing the relay Z which closes the contacts Z1, Z2, and Z3 and opens the contacts Z4 and Z5. The closing of Z1 energizes the relay Y through the switch 274, contact Z1, 245G and 60'''G thereby again closing Y1 to energize the solenoid 141. The solenoid 141 releases the pawl 138 from the detents 137 in the plate 136, and the motor 41 through the clutch 128 rotates the shaft 131, as hereinbefore described, to move the levers 110 and 112 in the opposite direction for moving the film-handling unit 19G from the projecting station to the carriage means 31. At the same time, Z3 locks in the relay Z, and Z4 cuts out the relay W which, in turn, cuts out the solenoid 185 thereby permitting the spring 189 to remove the sound drum 175 from the film-handling unit 19G and to move the flywheel 183 into engagement with the roller 186. As the levers 110 and 112 start their return movement, the switch 274 returns to its open position thereby deenergizing the relay Y and permitting the pawl 138 to ride on the periphery of the disc 136, the switch 276 returns to its normally open position to deenergize the motors 26 and 211 to stop the film strip advancing and take-up means, and the switch 276 returns to its normally closed position, but since the contact Z5 is open, the motor 188 cannot be energized. As the levers 110 and 112 reach the midpoint of their return travel, the follower 77 strikes the cam surface 157 and further movement of said levers cause said unit to be rotated through a second 90 degrees in a clockwise direction in the carrier means or members 114. The film-handling unit has now been rotated through 180 degrees from the position as originally occupied on the carriage means 31 and upon the next movement of said same unit into the projecting station, the wall 67 will lie adjacent the plate 18 instead of the wall 66 and the supply and take-up reels 78 will be interchanged with respect to position so that the film strip does not have to be rewound.

As the levers 110 and 112 move the film-handling unit 19G onto the carriage means, the pin 44 will engage the slot 47, the extension 49 will engage the slot 48, and the followers 76 and 77 will engage the slots 50 and 51 respectively, so that as the carriage means 31 is rotated for the next selection, the plates 32 and 33 will move the pin 44 and the extension 45 out of the slots 121 in the members 114 into engagement with the circular recesses 43 in the plates 14 and 15. When the unit 19G is in position on the carriage means, the lever 110 again closes the switch 256 to energize the solenoid 59G through Z2 thereby releasing the pawl 58 from the reduced portion 64 of the rod 53G which is then returned to its extended position by the spring 61 and the arm 65 enters the portion 64 to actuate the switch 60G to open the contacts 60'G, 60''G and 60'''G. The lever 110 also closes switch 271 and opens the switch 273. The opening of switch 273 deenergizes the relay Z and the various circuits will then be in their normal condition with Z2 and Z3 open and Z4 and Z5 closed, the only exception being that contacts 244G and 245G are now closed instead of 244E and 245E. If the same program is to be repeated, the carriage means 31 will not be rotated since the rod 53G will be placed in the way of lug 52. Upon making the selection by moving the button 10G inward and insertion of the coin 224 into the slot 12, the relay Y will be energized immediately for moving the unit 19G into the projecting station. The switches 256, 271 and 273 are positioned adjacent the lever 110 in such a manner as to actuate switch 256 before the other two switches.

Since other modifications and variations of the means, elements, circuits and other devices shown herein are possible, the present disclosure is to be construed in an illustrative sense, and the scope of the invention is to be determined by the claims which follow.

What we claim and desire to secure by Letters Patent of the United States of America is:

1. In an automatic multi-program projector, the combination with a frame, a plurality of film strips having a program thereon, a plurality of film-handling units, each adapted to contain one of said film strips and having a take up reel for the film strip, provided with a plurality of apertures to permit access to the film strip, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said projecting station, of a movable carriage means on said frame adapted to move said plurality of film-handling units past said transporting station, selecting means adapted to engage said carriage means for arresting said carriage means to position a selected film-handling unit in said transporting station in said predetermined position, a carriage moving means operatively connected to said carriage means for moving said carriage means, a guide means for directing the selected film-handling unit from said transporting station to said projecting station, a transporting means operatively connected to said cariage moving means and adapted to engage the selected film-handling unit positioned in said transporting station for movement thereof along said guide means into said projecting station, an advancing means for said film strip adapted to engage therewith upon positioning of said film-handling unit in said projecting station, a take-up means for said film strip adapted to engage said take-up reel in the selected film-handling unit positioned in said projecting station, and a control circuit operatively conected to said advancing means and said take-up means and actuated by said transporting means upon positioning the selected film-handling unit in said projecting station for initiating said advancing means and said take-up means.

2. In an automatic multi-program projector, the combination with a frame, a plurality of film strips having a program thereon, a plurality of film-handling units, each adapted to contain one of said film strips and having a take up reel for the film strip, provided with a plurality of apertures to permit access to the film strip, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said projecting station, of a movable carriage means on said frame adapted to move said plurality of film-handling units past said transporting station, selecting means adapted to engage said carriage means for arresting said carriage means to position a selected film-handling unit in said transporting station in said predetermined position, a carriage moving means operatively connected to said carriage means for moving said carriage means, a guide means for directing the selected film-handling unit from said transporting station to said projecting station, a transporting means operatively connected to said carriage moving means and adapted to engage the selected film-handling unit positioned in said transporting station for moving said unit from said carriage means along said guide means into said projecting station, holding said unit in said projecting station for the duration of movement of said film strip, and moving said film-handling unit along said guide means onto said carriage means, an advancing means for said film strip adapted to engage therewith upon positioning of said film-handling unit in said projecting station, a take-up means for said film strip adapted to engage said take-up reel in the selected film-handling unit positioned in said projecting station, and a control circuit operatively connected to said advancing means and said take-up means and actuated by said transporting means upon positioning the selected film-handling unit in said projecting station for initiating said advancing means and said take-up means and by said film strip at the end of said program to arrest said advancing means and said take-up means.

3. In an automatic multi-program projector, the combination with a frame, a plurality of film strips having a program thereon, a plurality of film-handling units, each adapted to contain one of said film strips, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said projecting station, of a movable carriage means on said frame adapted to move said plurality of film-handling units past said transporting station, selecting means adapted to engage said carriage means for arresting said carriage means to position a selected film-handling unit in said transporting station in said predetermined position, a carriage moving means operatively connected to said carriage means for moving said carriage means, a guide means for directing the selected film-handling unit from said transporting station to said projecting station, and a transporting means operatively connected to said carriage moving means and adapted to engage the selected film-handling unit positioned in said transporting station for movement thereof from said carriage means along said guide means into said projecting station.

4. In an automatic multi-program projector, the combination with a frame, a plurality of film-handling units, each adapted to contain one of said film strips, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said projecting station, of a moveable carriage means on said frame adapted to move said plurality of film-handling units past said transporting station, selecting means adapted to engage said carriage means for arresting said carriage means to position a selected film-handling unit in said transporting station in said predetermined position, a carriage moving means operatively connected to said carriage means for moving said carriage means, a guide means connecting said transporting station and said projecting station and for directing said film-handling unit into and out of said projecting station, and a transporting means operatively connected to said carriage moving means and adapted to engage the selected film-handling unit positioned in said transporting station for movement thereof from said carriage means along said guide means into and out of said projecting station.

5. In an automatic multi-program projector, the combination with a frame, a plurality of film strips having a program thereon, a plurality of film-handling units, each adapted to contain one of said film strips, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said projecting station, of a guide means on said frame for said film-handling units and for prescribing a path of travel therefor, a movable carriage means mounted between said frame to move said film-handling units along said path and past said transporting station, selecting means adapted to engage said carriage means for arresting said carriage means to position a selected film-handling unit in said transporting station in said predetermined position, a carriage moving means operatively connected to said carriage means and for moving said carriage means, a second guide means for directing the selected film-handling unit from said transporting station to said projecting station, and a transporting means operatively connected to said carriage moving means and adapted to engage the selected film-handling unit positioned in said transporting station for movement thereof from said carriage means along said guide means into and out of said projecting station.

6. In an automatic multi-program projector, the combination with a frame, a plurality of film strips having a program thereon, a plurality of film-handling units, each adapted to contain one of said film strips, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said projecting station, of a movable carriage means on said frame adapted to move said plurality of film-handling units past said transporting station, selecting means adapted to engage said carriage means for arresting said carriage means to position a selected film-handling unit in said transporting station in said predetermined position, a carriage moving means operatively connected to said carriage means for moving said carriage means, a guide means for directing the selected film-handling unit from said transporting station to said projecting station, a transporting means operatively connected to said carriage moving means and adapted to engage the selected film-handling unit positioned in said transporting station for movement thereof from said carriage means along said guide means into said projecting station, a latching means for holding said transporting means against movement when in said transporting station, and a latching control circuit operatively connected to said latching means and actuated by said carriage means when the selected film-handling unit is positioned in said transporting station for releasing said transporting means.

7. In an automatic multi-program projector, the combination with a frame, a plurality of film strips having a program thereon, a plurality of film-handling units, each adapted to contain one of said film strips, a transporting station on said frame for receiving one of said film-handling units in a predetermined position, a projecting station on said frame space from said transporting station for receiving one of said film-handling units in a position perpendicular to said predetermined position, and an illuminating and projection system on said frame for the film strip contained in the film-handling unit positioned in said projecting station, of a movable carriage means on said frame adapted to move said plurality of film-handling units past said transporting station, selecting means adapted to engage said carriage means for arresting said carriage means to position a selected film-handling unit in said transporting station in said predetermined position, a carriage moving means operatively connected to said carriage means for moving said carriage means, a guide means connecting said transporting station and said projecting station and for directing said film-handling unit into and out of said projecting station, and a transporting means operatively connected to said carriage moving means and adapted to engage the selected film-handling unit positioned in said transporting station for movement thereof from said carriage means along said guide means into and out of said projecting station, a latching means for holding said transporting means against movement when in said transporting station and said projecting station, and a latching control circuit operatively connected to said latching means and actuated by said carriage means when the selected film-handling unit is positioned in said transporting station and by the film strip in the selected film-handling unit when in said projecting station for releasing said transporting means.

8. In an automatic multi-program projector, the combination with a frame, a plurality of film strips having a program thereon, a plurality of film-handling units, each adapted to contain one of said film strips, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip containing in the film-handling unit positioned in said projecting station, of a guide means on said frame for said film-handling units and for prescribing a path of travel therefor, a movable carriage means mounted between said frame to move said film-handling units along said path and past said transporting station, selecting means adapted to engage said carriage means for arresting said carriage means to position a selected film-handling unit in said transporting station in said predetermined position, a carriage moving means operatively connected to said carriage means and for moving said carriage means, a second guide means for directing the selected film-handling unit from said transporting station to said projecting station, a transporting means operatively connected to said carriage moving means and adapted to engage the selected film-handling unit positioned in said transporting station for movement thereof from said carriage means along said guide means into and out of said projecting station, a latching means for holding said transporting means against movement when in said transporting station and said projecting station, and a latching control circuit operatively connected to said latching means and actuated by said carriage means when the selected film-handling unit is positioned in said transporting station and by the film strip in the selected film-handling unit when in said projecting station for releasing said transporting means.

9. In an automatic multi-program photographic projector, the combination with a frame comprising spaced-apart members, a plurality of film strips having a program thereon, a plurality of film-handling units, each adapted to contain one of said film strips and having a guide member and an operating member, a transporting station on said frame for receiving one of said film-handling units in a predetermined position, a projecting station on said frame spaced from said transporting station for receiving one of said film-handling units in a position perpendicular to said predetermined position, and an illuminating and projection system for the film strip contained in the film-handling unit positioned in said projecting station, of a guide means in said members for receiving said guide members and said operating members and for prescribing a path of travel for said film-handling units, selecting means for positioning a selected film-handling unit in said transporting station, a movable carriage means rotatably mounted between said members and adapted to engage said guide and operating members for moving said film-handling units along said guide means and for positioning said selected film-handling unit in said transporting station in said predetermined position, a carriage moving means operatively connected to said carriage means for rotating said carriage means, a second guide means connecting said transporting station and said projecting station, carrier means slidably mounted in said second guide means and normally positioned in said transporting station to receive the guide member and operating member of the selected film-handling unit positioned in said transporting station for movement thereof along said second guide means, camming means forming a part of one of said second guide means and adapted to cooperate with said operating member to rotate said film-handling unit through an angle of 90° upon movement thereof, and a transporting means operatively connected to said carriage moving means and to said carrier means for moving said film-handling unit from said carriage means along said second guide means into said projecting station.

10. In an automatic multi-program photographic projector, the combination with a frame comprising spaced-apart members, a plurality of film strips having a program thereon, a plurality of film-handling units, each adapted to contain one of said film strips and having a guide member and an operating member, a transporting station on said frame for receiving one of said film-handling units in a predetermined position, a projecting station on said frame spaced from said transporting station for receiving one of said film-handling units in a position perpendicular to said predetermined position, and an illuminating and projection system for the film strip contained in the film-handling unit positioned in said projecting station, of a guide means in said members for receiving said guide members and said operating members and for prescribing a path of travel for said film-handling units, selecting means for positioning a selected film-handling unit in said transporting station, a movable carriage means rotatably mounted between said members and adapted to engage said guide and operating members for moving said film-handling units along said guide means and for positioning said selected film-handling unit in said transporting station in said predetermined position, a carriage moving means operatively connected to said carriage means for rotating said carriage means, a second guide means connecting said transporting station and said projecting station, carrier means slidably mounted in said second guide means and normally positioned in said transporting station to receive the guide member and operating member of the selected film-handling unit positioned in said transporting station for movement thereof along said second guide means, camming means forming a part of one of said second guide means and adapted to cooperate with said operating member to rotate said film-handling unit through an angle of 90° upon movement thereof into and out of said projecting station, a transporting means operatively connected to said carriage means and to said carrier means for moving said film-handling unit from said carriage means along said second guide means into said projecting station, holding said film-handling unit in said projecting station for the duration of movement of said film strip, and moving said film-handling unit along said second guide means onto said carriage means.

11. In an automatic multi-program photographic projector, the combination with a frame comprising spaced-apart members, a plurality of film strips having a program thereon, a plurality of film-handling units, each adapted to contain one of said film strips and having a guide member and an operating member, a transporting station on said frame for receiving one of said film-handling units in a predetermined position, a projecting station on said frame spaced from said transporting station for receiving one of said film-handling units in a position perpendicular to said predetermined position, and an illuminating and projection system for the film strip contained in the film-handling unit positioned in said projecting station, of a guide means in said members for receiving said guide members and said operating members and for prescribing a path of travel for said film handling units, selecting means for positioning a selected film-handling unit in said transporting station, a movable carriage means rotatably mounted between said members and adapted to engage said guide and operating members for maintaining said units in a radial position with respect to the axis of rotation of said carriage means and for moving said film-handling units along said guide means to position the selected film-handling unit in said transporting station in said predetermined position, a carriage moving means operatively connected to said carriage means for rotating said carriage means, a second guide means on said members connecting said transporting station and said projecting station and extending perpendicular to said projecting station and intersecting said first-mentioned guide means, carrier means slidably mounted in said second guide means and normally positioned in said transporting station to receive said guide member and operating member of the selected film-handling unit positioned in said transporting station for movement thereof along said second guide means, camming means forming a part of one of said second guide means and adapted to cooperate with said operating member to rotate the selected film-handling unit through an angle of 90° upon movement thereof along said second guide means into and out of said projecting station, and a transporting means operatively connected to said carriage moving means and to said carrier means for moving said film-handling unit from said carriage means along said second guide means into said projecting station, holding said unit in said projecting station in a plane perpendicular to that when in said transporting station for the duration of movement of said film strip, and moving said film-handling unit out of said projecting station along said second guide means onto said carriage means in a reversed position coincident with said predetermined position.

12. In an automatic multi-program photographic projector, the combination with a frame comprising spaced-apart members, a plurality of film strips having a program thereon, a plurality of film-handling units, each adapted to contain one of said film strips and having a guide member and an operating member, a transporting station on said frame for receiving one of said film-handling units in a predetermined position, a projecting station on said frame spaced from said transporting station for receiving one of said film-handling units in a position perpendicular to said predetermined position, and an illuminating and projection system for the film strip contained in the film-handling unit positioned in said projecting station, of a guide means in said members for receiving said guide members and said operating members and for prescribing a path of travel for said film-handling units, selecting means for positioning a selected film-handling unit in said transporting station, a movable carriage means rotatably mounted between said members and adapted to engage said guide and operating members for moving said film-handling units along said guide means and for positioning said selected film-handling unit in said transporting station in said predetermined position, a carriage moving means operatively connected to said carriage means for rotating said carriage means, a second guide means connecting said transporting station and said projecting station, carrier means slidably mounted in said second guide means and normally positioned in said transporting station to receive the guide member and operating member of the selected film-handling unit positioned in said transporting station for movement thereof along said second guide means, camming means forming a part of one of said second guide means and adapted to cooperate with said operating member to rotate said film-handling unit through an angle of 90° upon movement thereof, a transporting means operatively connected to said carriage moving means and to said carrier means for moving said film-handling unit from said carriage means along said second guide means into said projecting station, a latching means for holding said transporting means against movement when said carrier means is in said transporting position, and a latching control circuit operatively connected to said latching means and actuated by said carriage means when the selected film-handling unit is positioned in said transporting station for releasing said transporting means.

13. In an automatic multi-program photographic projector, the combination with a frame comprising spaced-apart members, a plurality of film strips having a program thereon, a plurality of film-handling units, each adapted to contain one of said film strips and having a guide member and an operating member, a transporting station on said frame for receiving one of said film-handling units in a predetermined position, a projecting station on said frame spaced from said transporting station for receiving one of said film-handling units in a position perpendicular to said predetermined position, and an illuminating and projection system for the film strip contained in the film-handling unit positioned in said projecting station, of a guide means in said members for receiving said guide members and said operating members and for prescribing a path of travel for said film-handling units, selecting means for positioning a selected film-handling unit in said transporting station, a movable carriage means rotatably mounted between said members and adapted to engage said guide and operating members for moving said film-handling units along said guide means and for positioning said selected film-handling unit in said transporting station in said predetermined position, a carriage moving means operatively connected to said carriage means for rotating said carriage means, a second guide means connecting said transporting station and said projecting station, carrier means slidably mounted in said second guide means and normally positioned in said transporting station to receive the guide member and operating member of the selected film-handling unit positioned in said transporting station for movement thereof along said second guide means, camming means forming a part of one of said second guide means and adapted to cooperate with said operating member to rotate said film-handling unit through an angle of 90° upon movement thereof into and out of said projecting station, a transporting means operatively connected to said carriage means and to said carrier means for moving said film-handling unit from said carriage means along said second guide means into said projecting station for the duration of movement of said film strip, and moving said film-handling unit along said second guide means onto said carriage means, a latching means for holding said transporting means against movement when said carrier means is in said transporting station and said projecting station, and a latching control circuit operatively connected to said latching means and actuated by said carriage means when the selected film-handling unit is positioned in said transporting station and by the film strip in the selected film-handling unit when in said projecting station for releasing said transporting means.

14. In an automatic multi-program photographic projector, the combination with a frame comprising spaced-apart members, a plurality of film strips having a program thereon, a plurality of film-handling units, each adapted to contain one of said film strips and having a guide member and an operating member, a transporting station on said frame for receiving one of said film-handling units in a predetermined position, a projecting station on said frame spaced from said transporting station for receiving one of said film-handling units in a position perpendicular to said predetermined position, and an illuminating and projection system for the film strip contained in the film-handling unit positioned in said projecting station, of a guide means in said members for receiving said guide members and said operating members and for prescribing a path of travel for said film-handling units, selecting means for positioning a selected film-handling unit in said transporting station, a movable carriage means rotatably mounted between said members and adapted to engage said guide and operating members for maintaining said units in a radial position with respect to the axis of rotation of said carriage means and for moving said film-handling units along said guide means to position the selected film-handling unit in said transporting station in said predetermined position, a carriage moving means operatively connected to said carriage means for rotating said carriage means, a second guide means on said members connecting said transporting station and said projecting station and extending perpendicular to said projecting station and intersecting said first-mentioned guide means, carrier means slidably mounted in said second guide means and normally positioned in said transporting station to receive said guide member and operating member of the selected film-handling unit positioned in said transporting station for movement thereof along said second guide means, camming means forming a part of one of said second guide means and adapted to cooperate with said operating member to rotate the selected film-handling unit through an angle of 90° upon movement thereof along said second guide means into and out of said projecting station, a transporting means operatively connected to said carriage moving means and to said carrier means for moving said film-handling unit from said carriage means along said second guide means into said projecting station, holding said unit in said projecting station in a plane perpendicular to that when in said transporting station for the duration of movement of said film strip, and moving said film-handling unit out of said projecting station along said second guide means onto said carriage means in a reversed position and in a plane perpendicular to that of the projecting station, a latching means for holding said transporting means against movement when said carrier means is in said transporting station and said projecting station, and a latching control circuit operatively connected to said latching means and actuated by said carriage means when the selected film-handling unit is positioned in said transporting station and by said film strip when the selected film-handling unit is in said projecting station for releasing said transporting means.

15. In a multi-program photographic projector, the combination with a frame comprising spaced-apart members and having a transporting station, of a guide means in said members, a plurality of film-handling units, each adapted to contain a film strip and to be detachably positioned in said guide means, a movable carriage rotatably mounted between said members for moving said film-handling units along said guide means and for positioning a selected film-handling unit in said transporting station, and a carriage moving means operatively connected to said carriage means for rotating said carriage means.

16. In a multi-program photographic projector, the combination with a frame comprising spaced-apart members and having a transporting station, of a guide means in said members, a plurality of film-handling units, each adapted to contain a film strip and to be detachably positioned in said guide means, a movable carriage rotatably mounted between said members for moving said film-handling units along said guide means and for positioning a selected film-handling unit in said transporting station, a retaining means on said carriage means adapted to engage said film-handling units for preventing rotation of said film-handling units upon movement thereof and for maintaining said film-handling units in a radial position upon said carriage means, and a carriage moving means operatively connected to said carriage means for rotating said carriage means.

17. In a multi-program photographic projector, the combination with a frame comprising spaced-apart members, a plurality of film strips having a program thereon, a plurality of movable film-handling units, each adapted to contain one of said film strips, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said projecting station, of a guide means in said members for receiving said film-handling units and for prescribing a path of travel therefor, a movable carriage rotatably mounted between said members for moving said film-handling units along said guide means and for positioning a selected film-handling unit in said transporting station, in said predetermined position, and a carriage moving means operatively connected to said carriage means for rotating said carriage means.

18. In a multi-program photographic projector, the combination with a frame comprising spaced-apart members, a plurality of film strips having a program thereon, a plurality of movable film-handling units, each adapted to contain one of said film strips, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said operating member, and an illuminating and projection system on said frame for directing a light beam onto the film strip when in said projecting station, of a guide means in said members for receiving said guide members and said operating members and for prescribing a path of travel for said film-handling units, selecting means for positioning a selected film-handling unit in said transporting station, a movable carriage rotatably mounted between said members and adapted to engage said guide and operating members for moving said film-handling units along said guide means and for positioning said selected film-handling unit in said transporting station, in said predetermined position, and a carriage moving means operatively connected to said carriage means for rotating said carriage means.

19. In a multi-program photographic projector, the combination with a frame comprising spaced-apart members, a plurality of film strips having a program thereon, a plurality of movable film-handling units, each adapted to contain one of said film strips, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said projecting station, of a guide means in said members for receiving said guide members and said operating members and for prescribing a path of travel for said film-handling units, selecting means for positioning a selected film-handling unit in said transporting station, a movable carriage means rotatably mounted between said members for moving said film-handling units along said guide means and for positioning the selected film-handling unit in said transporting station, in said predetermined position, retaining means on said carriage means for engaging said guide members and operating members to prevent rotation of said film-handling units upon movement thereof and to maintain said film-handling units in a radial position upon said carriage means, and a carriage moving means operatively connected to said carriage means for rotating said carriage means.

20. In a multi-program photographic projector, the combination with a frame comprising spaced-apart members, a plurality of film strips having a program thereon, a plurality of movable film-handling units, each adapted to contain one of said film strips, a transporting station on said frame for receiving one of said film-handling units in a predetermined position, a projecting station on said frame spaced from said transporting station for receiving one of said film-handling units in a position perpendicular to said predetermined position, and an illuminating and projection system on said frame for the film strip contained in the film-handling unit positioned in said projecting station, of a circular guide means in said members for receiving a portion of said guide members and said operating members and for prescribing a path of travel for said film-handling units, selecting means for positioning a selected film-handling unit in said transporting station, a movable carriage means rotatably mounted between said members for moving said film-handling units along said guide means, and for positioning the selected film-handling unit in said transporting station in said predetermined position retaining means on said carriage means for engaging said guide members and operating members to prevent rotation of said film-handling units upon movement thereof and to maintain said film-handling units in a radial position with respect to said carriage means, a carriage moving means operatively connected to said carriage means for rotating said carriage means, and an indexing means on said carriage means adapted to engage said selecting means for arresting said carriage moving means when the selected film-handling unit is moved into said transporting station.

21. In an automatic multi-program projector, the combination with an optical system, a movable film-handling unit adapted to contain a film strip, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means for directing said film-handling unit from said transporting station to said projecting station, upon movement thereof, and a transporting means operatively connected to said film-handling unit for moving said film-handling unit along said guide means into said projecting station and for holding said film-handling unit in said projecting station.

22. In an automatic multi-program projector, the combination with an optical system, a movable film-handling unit adapted to contain a film strip, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means for directing said film-handling unit from said transporting station into and out of said projecting station upon movement thereof, and a transporting means operatively connected to said film-handling unit for moving said film-handling unit along said guide means into said projecting station, holding said film-handling unit in said guide means, and moving said film-handling unit along said guide means out of said projecting station.

23. In an automatic multi-program projector, the combination with an optical system, a movable film-handling unit adapted to contain a film strip and having a guide member and an operating member thereon, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means adapted to receive said guide member and said operating member for directing said film-handling unit from said transporting station into said projecting station, means forming a part of one of said guide means and adapted to cooperate with said operating member to rotate said film-handling unit through an angle of 90° upon movement thereof, and a transporting means operatively connected to said guide member and said operating member for moving said film-handling unit along said guide means into said projecting station.

24. In an automatic multi-program projector, the combination with an optical system, a movable film-handling unit adapted to contain a film strip and having a guide member and an operating member thereon, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means adapted to receive said guide member and said operating member for directing said film-handling unit from said transporting station into said projecting station, means forming a part of one of said guide means and adapted to cooperate with said operating member to rotate said film-handling unit through an angle of 90° upon movement thereof, and a transporting means operatively connected to said guide member and said operating member for moving said film-handling unit along said guide means and out of said projecting station.

25. In an automatic multi-program projector, the combination with an optical system, a movable film-handling unit adapted to contain a film strip and having a guide member and an operating member thereon, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means adapted to receive said guide member and said operating member for directing said film-handling unit from said transporting station into and out of said projecting station, means forming a part of one of said guide means and adapted to cooperate with said operating member to rotate said film-handling unit through an angle of 90° upon movement thereof, and a transporting means operatively connected to said guide member and said operating member for moving said film-handling unit along said guide means into and out of said projecting station.

26. In an automatic multi-program projector, the combination with an optical system, a movable film-handling unit adapted to contain a film strip and having an axis of rotation and a guide member and an operating member arranged along said axis, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means extending perpendicularly from said projecting station and adapted to receive said guide member and said operating member for directing said film-handling unit from said transporting station into said projecting station, camming means along one of said guide means and adapted to cooperate with said operating member to rotate said film-handling unit about said axis through an angle of 90° upon movement thereof toward said projecting station, and a transporting means operatively connected to said guide member and said operating member for moving said film-handling unit along said guide means into said projecting station.

27. In an automatic multi-program projector, the combination with an optical system, a movable film-handling unit adapted to contain a film strip and having an axis of rotation and a guide member and an operating member arranged along said axis, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means extending perpendicularly from said projecting station and adapted to receive said guide member and said operating member for directing said film-handling unit out of said projecting station and into said transporting station, camming means along one of said guide means and adapted to cooperate with said operating member to rotate said film-handling unit about said axis through an angle of 90° upon movement thereof out of said projecting station, and a transporting means operatively connected to said guide member and said operating member for moving said film-handling unit along said guide means and out of said projecting station.

28. In an automatic multi-program projector, the combination with an optical system, a movable film-handling unit adapted to contain a film strip and having an axis of rotation and a guide member and an operating member arranged along said axis, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means extending perpendicularly from said projecting station and adapted to receive said guide member and said operating member for directing said film-handling unit from said transporting station into and out of said projecting station, camming means along one of said guide means and adapted to cooperate with said operating member to rotate said film-handling unit about said axis through an angle of 90° upon movement thereof toward and away from said projecting station, and a transporting means adapted to operatively engage said guide member and said operating member for moving said film-handling unit along said guide means into and out of said projecting station.

29. In an automatic multi-program projector, the combination with an optical system, a movable film-handling unit adapted to contain a film strip and having an axis of rotation and a guide member and an operating member arranged along said axis, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means extending perpendicularly from said projecting station and adapted to receive said guide member and said operating member for directing said film-handling unit from said transporting station into and out of said projecting station, camming means forming a part of one of said guide means and adapted to cooperate with said operating member to rotate said film-handling unit about said axis upon movement thereof toward and away from said projecting station, and a transporting means operating connected to said guide member and said operating member for moving said film-handling unit along said guide means and holding said unit in said projecting station in a position perpendicular to said predetermined position and for moving said film-handling unit out of said projecting station and along said guide means to said transporting station in a reversed position coincident with said predetermined position.

30. In an automatic multi-program projector, the combination with an optical system, a movable film-handling unit adapted to contain a film strip and having an axis of rotation and a guide member and an operating member secured to said film-handling unit and arranged along said axis, a transporting station for receiving said film-handling unit in a predetermined position, and a projecting station spaced from said transporting station in the direction of movement of said film-handling unit for receiving said film-handling unit in a position perpendicular to said predetermined position and aligned with said optical system, of guide means extending perpendicular from said projecting station and adapted to receive said guide member and said operating member for directing said film-handling unit from said transporting station into and out of said projecting station, camming means forming a part of one of said guide means and adapted to cooperate with said operating member to rotate said film-handling unit through an angle of 90° upon movement thereof toward said projecting station and to rotate said film-handling unit through a second angle of 90° upon movement thereof from said projecting station to said transporting station, and a transporting means operatively connected to said guide member and said operating member for moving said film-handling unit along said guide means from said transporting station to said projecting station and for moving said film-handling unit out of said projecting station along said guide means to said transporting station in a reversed position.

31. In a reversible magazine for motion picture apparatus, the combination with a casing adapted to contain a film strip and having an axis of rotation in a plane parallel to the sides of said casing, and film guide means within said casing for defining a film path having at least two portions of symmetrical with respect to said axis, of a guide member on one end of said casing and arranged along said axis, and an operating member on the other end of said casing and arranged along said axis including an actuating member spaced from said casing and a second actuating member adjacent to and perpendicular to said first-mentioned actuating member, whereby upon movement of said casing said actuating members rotate said casing.

32. In a reversible magazine for motion picture apparatus, the combination with a casing adapted to contain a film strip and having an axis of rotation in a plane parallel to the sides of said casing, and film guide means within said casing for defining a film path having at least two portions symmetrical with respect to said axis, of a cylindrical guide and support member on one end of said casing and arranged along said axis, and an operating and support member on the other end of said casing and arranged along said axis including an actuating member spaced from said casing and perpendicular to said plane and a second actuating member adjacent to said first mentioned actuating member and parallel to said plane, whereby upon movement of said casing each acuating member causes said casing to be rotated through an angle of 90°.

33. In a reversible magazine for motion picture apparatus, the combination with a casing adapted to contain a film strip and having an axis of rotation in a plane parallel to the sides of said casing, and film guide means within said casing for defining a film path having at least two portions symmetrical with respect to said axis, of a cylindrical guide and support member on one end of said casing and arranged along said axis, and operating and support member on the other end of said casing and arranged along said axis including an actuating member spaced from said casing and perpendicular to said plane, a second actuating member adjacent to said first-mentioned actuating member and parallel to said plane, and a cylindrical guide and a support member adjacent said second actuating member, whereby upon movement of said casing each actuating member causes said casing to be rotated through an angle of 90°.

34. In a reversible magazine for motion picture apparatus, the combination with a casing adapted to contain a film strip and having an axis of rotation in a plane parallel to the sides of said casing, and film guide means within said casing for defining a film path having at least two portions symmetrical with respect to said axis, of a cylindrical guide and support member on one end of said casing and arranged along said axis, and an operating and support member on the other end of said casing and arranged along said axis including a substantially rectangular actuating member spaced from said casing and perpendicular to said plane, a second substantially rectangular actuating member adjacent to said first-mentioned actuating member and parallel to said plane, and a cylindrical guide and support member adjacent said second actuating member, whereby upon movement of said casing each actuating member causes said casing to be rotated through an angle of 90°.

35. In a reversible magazine for motion picture apparatus, the combination with a casing adapted to contain a film strip and having an axis of rotation in a plane parallel to the sides of said casing, and film guide means within said casing for defining a film path having at least two portions symmetrical with respect to said axis, of a cylindrical guide and support member on one end of said casing and arranged along said axis, and an operating and support member on the other end of said casing and arranged along said axis including a substantially rectangular actuating member spaced from said casing and perpendicular to said plane, a second substantially rectangular actuating member adjacent to said first-mentioned actuating member and parallel to said plane, and a cylindrical guide and support member adjacent said second actuating member, whereby upon movement of said casing in a direction parallel to said plane said first-mentioned actuating member rotates said casing through an angle of 90° and upon movement of said casing in a direction perpendicular to said plane said second actuating member rotates said casing through an angle of 90°.

D'ARCY A. YOUNG, Jr.
ROBERT A. FOX.

REFERENCES CITED

The following references are of record in the file of this patent:

UNITED STATES PATENTS

| Number | Name | Date |
|---|---|---|
| 1,073,411 | Dressler et al. | Sept. 16, 1913 |
| 1,267,411 | Howell | May 28, 1918 |
| 1,485,907 | Brown | Mar. 4, 1924 |
| 1,839,064 | Thornton | Dec. 29, 1931 |
| 1,969,484 | Stewart | Aug. 7, 1934 |
| 2,116,314 | Jenkins et al. | May 3, 1938 |
| 2,151,700 | Holman | Mar. 28, 1939 |
| 2,180,639 | McMahon et al. | Nov. 21, 1939 |
| 2,206,134 | Streychmans | July 2, 1940 |
| 2,214,468 | Lannerd | Sept. 10, 1940 |
| 2,227,259 | Hokanson | Dec. 31, 1940 |
| 2,238,719 | De Lartos | Apr. 15, 1941 |
| 2,322,489 | Von Madaler | June 22, 1943 |
| 2,434,200 | Engelken | Feb. 23, 1944 |

FOREIGN PATENTS

| Number | Country | Date |
|---|---|---|
| 279,241 | Great Britain | Nov. 8, 1927 |
| 447,543 | Great Britain | May 18, 1936 |